United States Patent [19]

Diem et al.

[11] Patent Number: 5,071,316

[45] Date of Patent: Dec. 10, 1991

[54] COMBINATION COOLANT PUMP DRIP COLLECTION, BELT TENSIONER

[75] Inventors: Craig A. Diem, Sandusky; Steven F. Baker, Bellevue, both of Ohio

[73] Assignee: General Motors corporation, Detroit, Mich.

[21] Appl. No.: 653,213

[22] Filed: Feb. 11, 1991

[51] Int. Cl.⁵ .................. F01D 25/00; F04D 29/00
[52] U.S. Cl. ..................... 415/168.1; 415/169.1; 417/362
[58] Field of Search ............... 415/168.1, 168.2, 169.1; 417/362

[56] References Cited

U.S. PATENT DOCUMENTS

| | | | |
|---|---|---|---|
| 3,137,237 | 6/1984 | Zagar et al. | 415/168.2 |
| 3,168,871 | 2/1965 | Sieghartner | 415/168.2 |
| 3,838,901 | 10/1974 | Sampatacos | 308/187 |
| 3,895,811 | 7/1975 | Richard, Jr. et al. | 277/22 |
| 4,380,416 | 4/1983 | Menager | 415/168.2 |
| 4,768,923 | 9/1988 | Baker | 415/170 A |
| 4,979,875 | 12/1990 | Müller et al. | 415/168.1 |

Primary Examiner—Edward K. Look
Assistant Examiner—Michael S. Lee
Attorney, Agent, or Firm—Patrick M. Griffin

[57] ABSTRACT

A vehicle coolant pump is improved with the addition of a channel shaped shield that surrounds the coolant weep holes. In addition to protecting the weep holes, expelled coolant is collected and allowed to evaporate before it can visibly pond. The channel also serves as a convenient point for the provision of wrenching flats when the pump housing is also used as a belt tension adjuster.

2 Claims, 2 Drawing Sheets

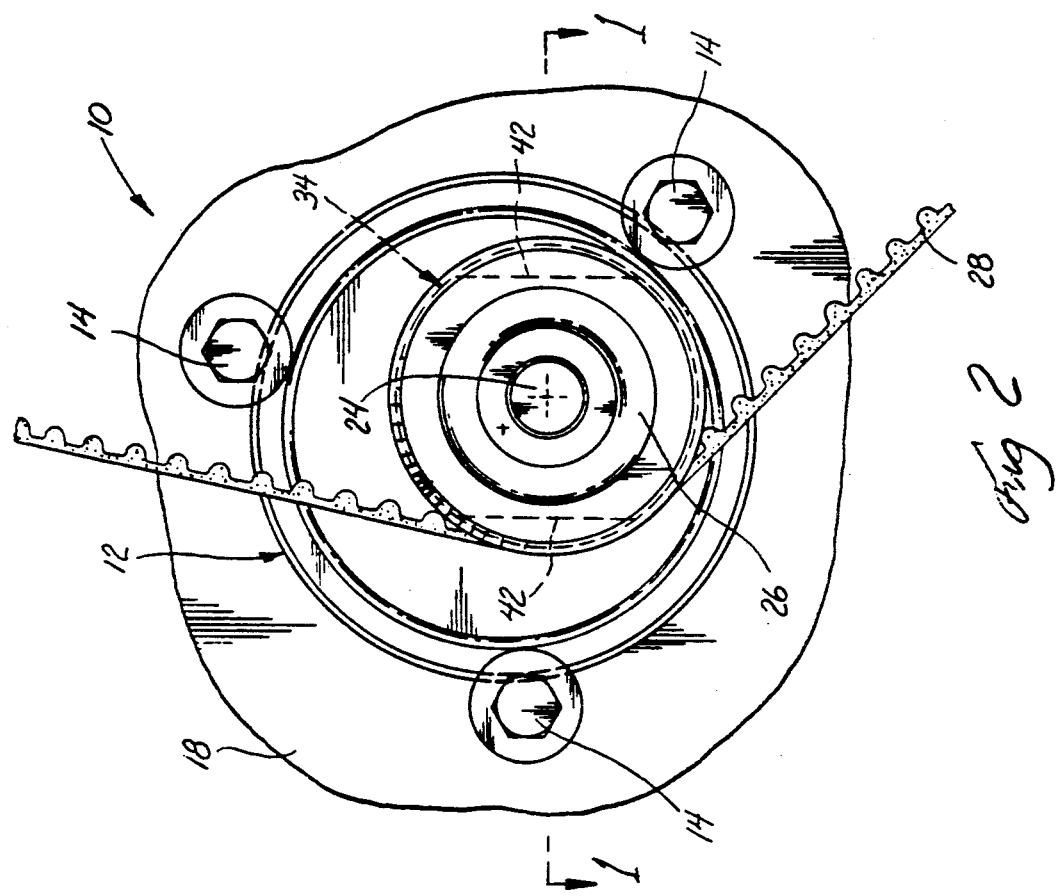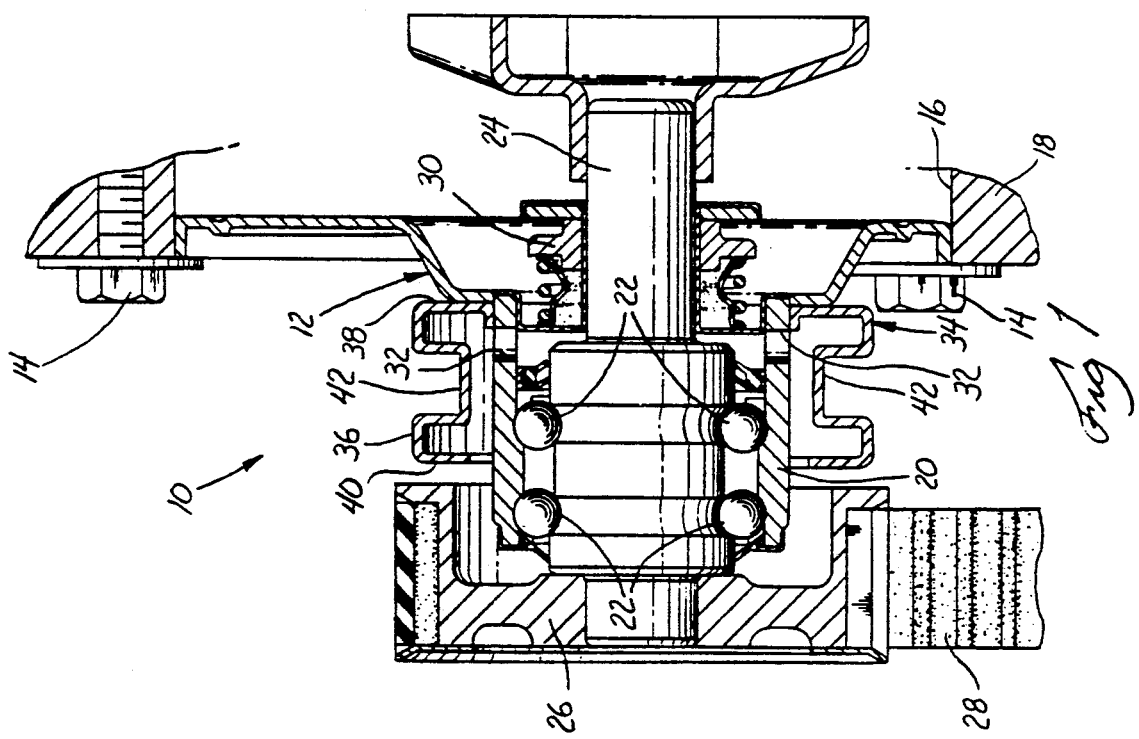

COMBINATION COOLANT PUMP DRIP COLLECTION, BELT TENSIONER

This invention relates to vehicle cooling systems in general, and specifically to an improved coolant pump assembly that includes a means to collect and handle normal coolant leakage as well as providing a convenient way to apply belt tensioning torque.

Background of the Invention

Vehicle engines are generally cooled by a coolant pump that has a belt driven pump shaft and impeller to circulate liquid coolant. Typically, a pump housing is detachably connected to the engine block and a shaft supporting bearing assembly is press fitted within a sleeve of the housing. Alternately, one could integrate the coolant pump, bearing and seal assembly, such as is disclosed in U.S. Pat. No. 4,768,923.

When a belt driven impeller is used in a coolant pump, some type of rubbing seal must generally be used. This is a consequence of the fact that the impeller driving shaft must physically extend through the pump housing, at least in the absence of some sort of magnetic drive that can operate across a closed wall. Despite the general effectiveness of these seals, a small amount of liquid coolant can normally be expected to leak past the seal. The corrosive, hot coolant, if it contacts the impeller shaft bearing located on the opposite side of the seal, can damage the bearing. To avoid that, vent holes are typically located axially between the seal and the bearing, which vent the normal coolant leakage away from the bearing to ambient. While this avoids bearing damage, the vented coolant may visibly puddle, either on the engine block or on the ground, and might be wrongly diagnosed as a failed seal. Also, dirt and other foreign matter may enter or clog the vent holes, since they are generally directly exposed to the ambient.

An independent consideration is the need to maintain proper tension in the belt that drives the coolant pump, as well as other vehicle accessories. Some systems use the pump assembly as a belt tensioner by making the pump housing pivotable about an axis, and offsetting the belt pulley from that axis. Then, when the pump housing is loosened and pivoted, the eccentric pulley swings around the primary pump housing axis and pulls the belt tighter, or loosens it. It is necessary that there be some surface associated with the pump housing to which a force can be easily applied to cause the pump housing to twist. In the past, the pump housing has been altered by casting it with flat surfaces to which a wrench can be applied.

SUMMARY OF THE INVENTION

The subject invention prevents the visible coolant puddling problem noted above, and at the same time shields and protects the vent holes In addition, in the embodiment disclosed, a wrench application surface for belt tensioning is provided at no extra cost and without altering the basic pump housing shape.

In the embodiment disclosed, an annular retention channel fixed to the housing is stamped roughly in the shape of a tire, with a center wall and a pair of side walls that create a concave interior. One of the side walls is radially wider, and is fixed to the pump housing so as to locate the channel over the vent holes. The other side wall does not touch the pump housing, and so leaves one side of the channel interior open to ambient. As with water in a tire, any leaking coolant vented from the pump housing will collect around bottom dead center of the channel interior, and will not normally overrun it. Eventually, the collected coolant will evaporate to ambient, and not create a puddle visible to the driver. Excessive leakage would escape the channel, and indicate a potential problem. The channel also surrounds, shields and protects the vent holes.

In addition, in the embodiment disclosed, the pump housing is mounted to the vehicle so that it can be loosened and pivoted about a primary axis. The retention channel, like the belt pulley, is affixed to the pump housing at a location offset from the primary axis. Therefore, a force applied to the retention channel creates a torque to pivot the pump housing and thereby tighten the belt. A force application surface is provided without altering the pump housing in any way by stamping a pair of diametrically opposed flats into the retention channel. A wrench or similar torque applying tool may then be conveniently used on the retention channel.

It is therefore a general object of the invention to provide a device for collecting the normal coolant leakage from a vehicle coolant pump to prevent it from visibly puddling.

It is another object of the invention to provide a means that allows coolant to visibly puddle only when it has exceeded normal leakage.

It is another object of the invention to provide such a means in the form of a retention channel that surrounds and shields the pump housing vent holes.

It is yet another object of the invention to provide torque tool application surfaces in the retention channel that allow belt tensioning force to be easily applied.

DESCRIPTION OF THE PREFERRED EMBODIMENT

These and other objects and features of the invention will appear from the following written description and from the drawings, in which:

FIG. 1 is a side elevational view, partially in section, of a coolant pump assembly and the preferred embodiment of the present invention taken along lines 1—1 of FIG. 2;;

FIG. 2 is a front elevational view of a coolant pump housing, fixed to the engine block, that uses an eccentric pulley to perform belt tension adjustments;

Figure 3:
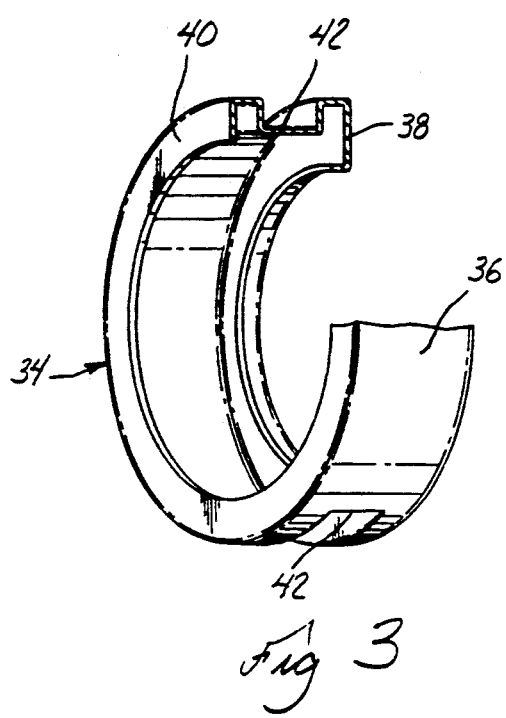
FIG. 3 is a perspective view of a preferred embodiment of the present invention.

Referring to FIGS. 1 and 2, a coolant pump assembly incorporating a preferred embodiment of the invention is designated generally at 10. The main component of assembly 10 is a stamped steel pump housing, indicated generally at 12, which is basically cylindrical in shape and bolted at 14 into a matching cylindrical coolant chamber 16 of engine block 18. As such, if bolts 14 are loosened, housing 12 may be pivoted about its primary, central axis by twisting it within chamber 16. A cylindrical bearing race 20 is welded to pump housing 12 in a forward, protruding position, and in effect becomes an integral part of pump housing 12. Bearing race 20 is deliberately placed off-center relative to the primary axis of pump housing 12, however, for a reason described below. Bearing race 20 contains ball bearings 22, which rotatably support a pump impeller shaft 24 driven by a belt pulley 26 and drive belt 28. A conventional pump seal 30 seals substantially all of the coolant in chamber 16 and away from ball bearings 22. However, as noted above, bearing race 20 has weep or vent holes 32, located axially outboard of seal 30 and inboard of bearings 22, to vent to ambient the relatively small volume of coolant that does normally leak past a seal like seal 30. Here, there are two vent holes 32, at twelve and six o'clock, although there could be more.

Figure 4:
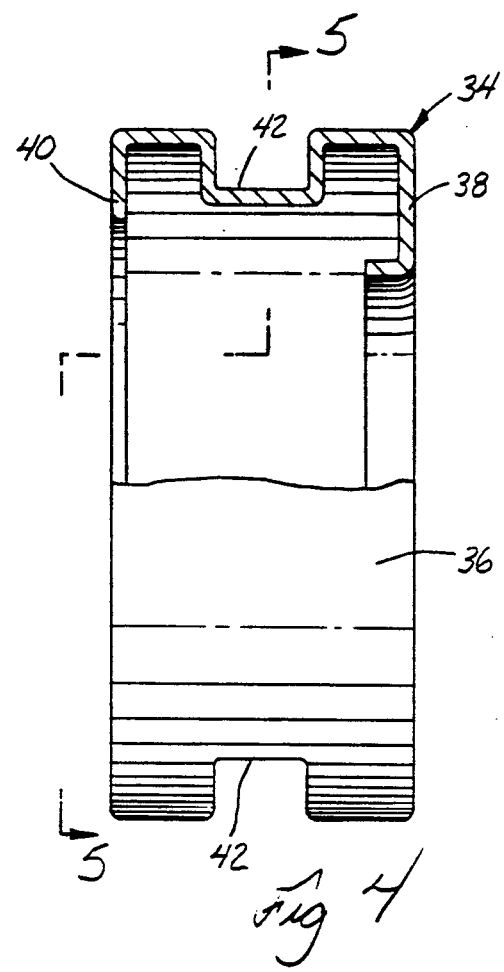
FIG. 4 is a view of the preferred embodiment partially in side elevation and partially in cross section.
Figure 5:
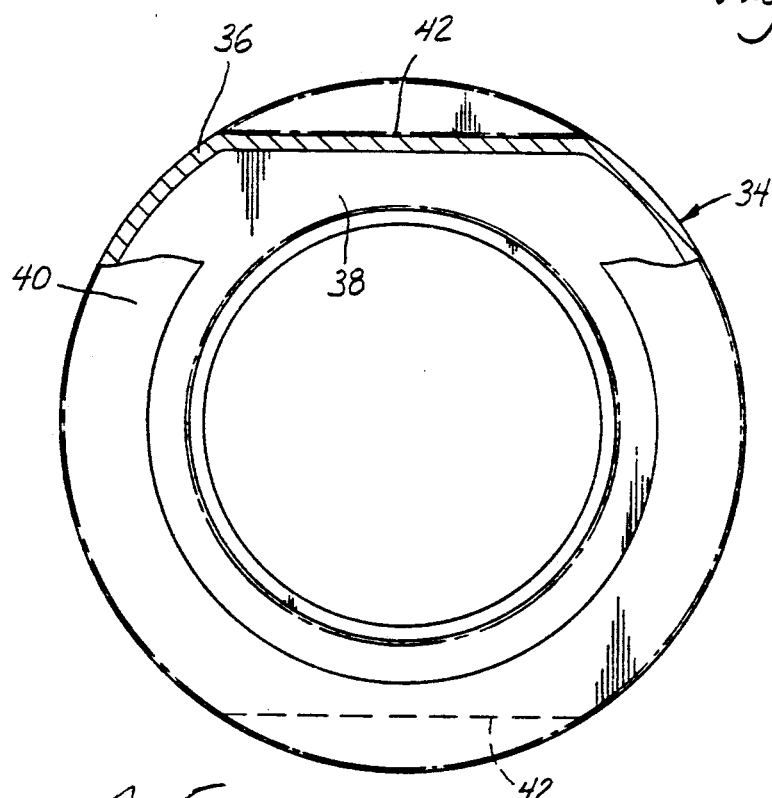
FIG. 5 is a sectional view taken along line 5—5 of FIG. 4.

Referring next to FIGS. 3 through 5, structural details of the remaining component of assembly 10, an annular stamped steel retention channel indicated generally at 34, are illustrated. Channel 34 is basically C-shaped in cross section, with a cylindrical center wall 36, a wider annular side wall 38 with an inner diameter equal to the bearing race 20, and a narrower annular side wall 40. The three walls create an interior volume, similar to that of a tire, which, if disposed substantially vertically, will collect and hold a volume of liquid in an arcuate pool at bottom dead center. The volume of retained liquid would be very difficult to dislodge, just as it is from a tire. In addition, in the embodiment disclosed, channel 34 has a pair of diametrically opposed flats 42 stamped into center wall 36, which comprise chords of the circle of center wall 36, in effect, subtending about 70 degrees each. Flats 42 serve a purpose further described below.

Referring again to FIGS. 1 and 2, it may be seen how channel 34 cooperates with pump housing 12. Before pulley 26 is added, the wider channel side wall 38 is slipped over the outside of bearing race 20 as far as it will go, until it abuts pump housing 12. Then, it is welded in place in an orientation such that the flats 42 are on the sides, or preferably not right at top and bottom dead center. Then, pulley 26 and belt 28 are added. Channel 34 covers the vent holes 32 to the maximum extent possible, since the vent holes 32 are close to the weld on the wider side wall 38. A concave interior of channel 34 is presented to all of the vent holes 32, no matter how many in number. Any leaking coolant that is expelled, either forcibly through vent holes 32 that are located high, or simply by draining out of vent holes 32 that are located low, will necessarily enter and be trapped in the channel 34. A significant volume of expelled coolant can settle and collect inside channel 34 without visibly ponding beneath the vehicle. The flats 42 are deliberately not put at bottom dead center, so as not to invade the interior volume of channel 34 at the point of collection. While the side wall 40 is narrower than 38, it comes close enough to the outside of bearing race 20 that enough expelled coolant can collect without running over wall 40 to accommodate the normal, expected coolant leakage. There is enough space between the inner edge of the narrower channel side wall 40 and the outside surface of bearing race 20, however, to leave an exit path or passage located above the level of the collected and retained coolant through which it can continually evaporate to ambient, creating room for more. Channel 34 also serves to shield the vent holes 32 from dirt or other contaminants. Another advantage is that the inboard edge of pulley 26 and channel side wall 40 come axially close enough together to cooperatively surround and shield most of the outside of bearing race 20, in addition to the vent holes 32.

Still referring to FIGS. 1 and 2, the belt tensioning feature of the invention may be seen. The forward, protruding location of bearing race 20 make it a convenient point to apply a wrench to pump housing 12, and the flats 42 are sized to fit such a tool. With bolts 14 loosened, a wrenching force applied to the flats 42 will translate directly to the off-center bearing race 20 to which channel 34 is solidly welded, creating a torque on pump housing 12 about its primary axis to twist it within the chamber 16. As pulley 26 orbits around the primary axis of pump housing 12, it changes the tension against belt 28. The shape of neither bearing race 20 nor pump housing 12 need be changed, since the flats 42 may be easily stamped into the channel 34. This is a great advantage, since both bearing race 20 and pump housing 12 are made of heavier, more expensive materials than is channel 34, and each is more easily made in a cylindrical shape as shown.

Variations of the preferred embodiment disclosed could be made without departing from the spirit of the invention. More vents holes 32 than just two could be provided, since the surrounding, continuous nature of channel 34 means that all additional vent holes would be covered, not just those that drained under the force of gravity. Thus, channel 34 would be particularly useful as a collector if a singer ring were added to shaft 24, which threw leaked coolant outwardly. Channel 34 could be stamped without the flats 42 in a case where it was not desired to use the pump housing 12 as a belt tensioner. More than two flats like 42 could be provided, in a polygonal shape, for example, providing more possible application orientations for the torque wrench. Even if one of the flats 42 were to rest at bottom dead center, there is still substantial interior volume left in channel 34, since the flat 42 does not occupy the entire axial width of center wall 36. Making center wall 36 axially wider, or making side wall 40 radially wider, would provide even more interior retention volume. Also, while the evaporation path provided for collected leakage is disclosed as being the circumferential space between narrower side wall 40 and bearing race 20, the narrower side wall 40 could also touch the outside of bearing race 20, and even be welded thereto as well. In that case, another vapor exit path would be provided, such as smaller holes drilled directly. If the exit holes were drilled far above top dead center, then the collected lubricant could be made to rise to a higher level, and the volume of accommodated leakage could be made quite large. Therefore, it will be understood that it is not intended to limit the invention to just the embodiment disclosed.

The embodiments of the invention in which an exclusive property or privilege is claimed are defined as follows:

1. In combination with a vehicle coolant pump assembly having a pump housing and a coolant seal that substantially prevents the loss of coolant from said pump housing, but which is subject to a normal volume of leakage, said pump housing also having a vent hole axially outboard of said seal to vent said normal volume of leakage to ambient, the improvement comprising, a retention channel fixed to said pump housing and surrounding said vent hole, said retention channel having a concave interior in which coolant exiting said vent opening is collected and retained, said channel also having an opening to ambient located above the level of said collected and retained coolant, so as to create an evaporation path to ambient for said collected and retained coolant.

2. A combination coolant pump and tensioner. assembly for a vehicle having a drive belt, comprising, a pump housing mounted to said vehicle so as to be selectively pivotable about an axis when a torque is applied to said pump housing about said first axis, a belt engaging pulley rotatably mounted to said pump housing at a location offset from said axis so as to swing about said axis when said pump housing is pivoted and change the tension in said drive belt, a coolant seal substantially preventing the loss of coolant from said pump housing, but subject to a normal volume of leakage, said pump housing also having a vent hole axially outboard of said seal to vent said normal coolant leakage to ambient, and, a retention channel fixed to said pump housing and surrounding said vent hole, said retention channel having a concave interior in which coolant exiting said vent opening is collected and retained, said channel also having an opening to ambient located above the level of said collected and retained coolant, so as to create an evaporation path to ambient for said collected and retained coolant, said channel also having an exterior with a flattened portion to which a force may be applied, thereby creating a torque about said axis to pivot said pump housing and change the tension in said drive belt.

* * * * *